(12) United States Patent
    Morreale

(10) Patent No.: US 8,997,122 B2
(45) Date of Patent: Mar. 31, 2015

(54) BLOCK DEVICE MANAGEMENT

(71) Applicant: Silicon Graphics International Corp., Milpitas, CA (US)

(72) Inventor: Peter W. Morreale, Longmont, CO (US)

(73) Assignee: Silicon Graphics International Corp., Milpitas, CA (US)

( * ) Notice: Subject to any disclaimer, the term of this patent is extended or adjusted under 35 U.S.C. 154(b) by 0 days.

(21) Appl. No.: 14/492,248

(22) Filed: Sep. 22, 2014

(65) Prior Publication Data

US 2015/0046606 A1  Feb. 12, 2015

Related U.S. Application Data

(63) Continuation of application No. 13/835,575, filed on Mar. 15, 2013, now Pat. No. 8,881,176.

(51) Int. Cl.
  *G06F 13/00* (2006.01)
  *G06F 9/445* (2006.01)
  *G06F 13/10* (2006.01)

(52) U.S. Cl.
  CPC ............ *G06F 9/44505* (2013.01); *G06F 13/10* (2013.01)

USPC .......................................................... 719/321

(58) Field of Classification Search
  CPC ..................................................... G06F 9/4411
  USPC .......................................................... 719/321
  See application file for complete search history.

(56) References Cited

U.S. PATENT DOCUMENTS

| 8,161,126 | B2 | 4/2012 | Fan |
| 8,881,176 | B2 | 11/2014 | Morreale |
| 2004/0003137 | A1 | 1/2004 | Callender et al. |
| 2014/0280957 | A1 | 9/2014 | Martin |
| 2014/0281046 | A1 | 9/2014 | Morreale |

*Primary Examiner* — Andy Ho

(74) *Attorney, Agent, or Firm* — Lewis Roca Rothgerber LLP

(57) ABSTRACT

Embodiments of the present invention perform a method for reading data from, writing data to, powering on, or configuring a block device without the kernel translating a file system operation into a block device operation. This is implemented by a using a core module to couple applications running in user space to a character device through a character device driver, the core module configures the character device to communicate with a block device through a block device driver without the kernel translating a file system command into a block device command.

12 Claims, 4 Drawing Sheets

BLOCK DEVICE MANAGEMENT

CROSS-REFERENCE TO RELATED APPLICATIONS

The present application is a continuation and claims the priority benefit of U.S. patent application Ser. No. 13/835,575 filed Mar. 15, 2013, now U.S. Pat. No. 8,881,176 the disclosure of which is incorporated herein by reference.

BACKGROUND OF THE INVENTION

1. Field of the Invention

The present invention generally relates to block device request management. More specifically, the present invention relates to the direct control of a block data storage device (block device) being controlled by an application running on a computer system in user space.

2. Description of the Related Art

Currently when an I/O request is received through hardware, that request is passed from the hardware to the operating system kernel. The kernel evaluates the request, configures a host bus adaptor (HBA), and the kernel sends I/O blocks to disk for storage. Applications running in user space do not know where a particular file resides. This is because the hardware is abstracted from applications by the kernel. For example, if a user commands an application to open a file, the application must communicate a file request with the kernel and the kernel parses the file system, determines where on the file is located, initiates block commands to the block device, and sends the file to the application.

There is a need for an improved block device management when I/O blocks are to be stored in different ways.

SUMMARY OF THE CLAIMED INVENTION

An embodiment of the invention performs a method for reading data from, writing data to, powering on, and configuring a block device without the kernel translating a file system operation into a block device operation. This is implemented by using a core module to couple applications running in user space to a character device through a character device driver. The core module configures the character device to communicate with a block device through a block device driver without the kernel translating a file system command into a block device command.

An embodiment of a system for coupling applications running in user space on a computer system with hardware block devices may include a processor, a memory, and a core module. The core module may be stored in the memory and executed by the processor to configure a character device to be in communication with a character device driver and a block device to be in communication with a block device driver. The core module may also be executable to associate an application with the character device and associating the character device with the block device such that the application communicates with the block device through association made by the core module.

DETAILED DESCRIPTION

Embodiments of the present invention perform a method for reading data from, writing data to, powering on, and configuring a block device without the kernel translating a file system operation into a block device operation. This is implemented by using a core module to couple applications running in user space to a character device through a character device driver. The core module may configure the character device to communicate with a block device through a block device driver without the kernel translating a file system command into a block device command.

The methodology of using a core module to link and associate a character device to a block device is a unique aspect of the invention. The invention enables a software module (a character device) that typically only understands file system commands to communicate with a block device using block commands. The invention increases overall system performance by bypassing much of the kernel, freeing the kernel to run higher priority tasks. Thus, a program running in application space may configure a block device, power up a block device, read data from a block device, or write data to a block device directly using block commands.

In certain embodiments of the invention, a hardware event, such as a request for data, is intercepted by the core module. The core module resides in the application layer and communicates with the character device through a character device driver. The character device driver and character device may be implemented in a single software module or in separate software modules stored in memory.

Figure 1:
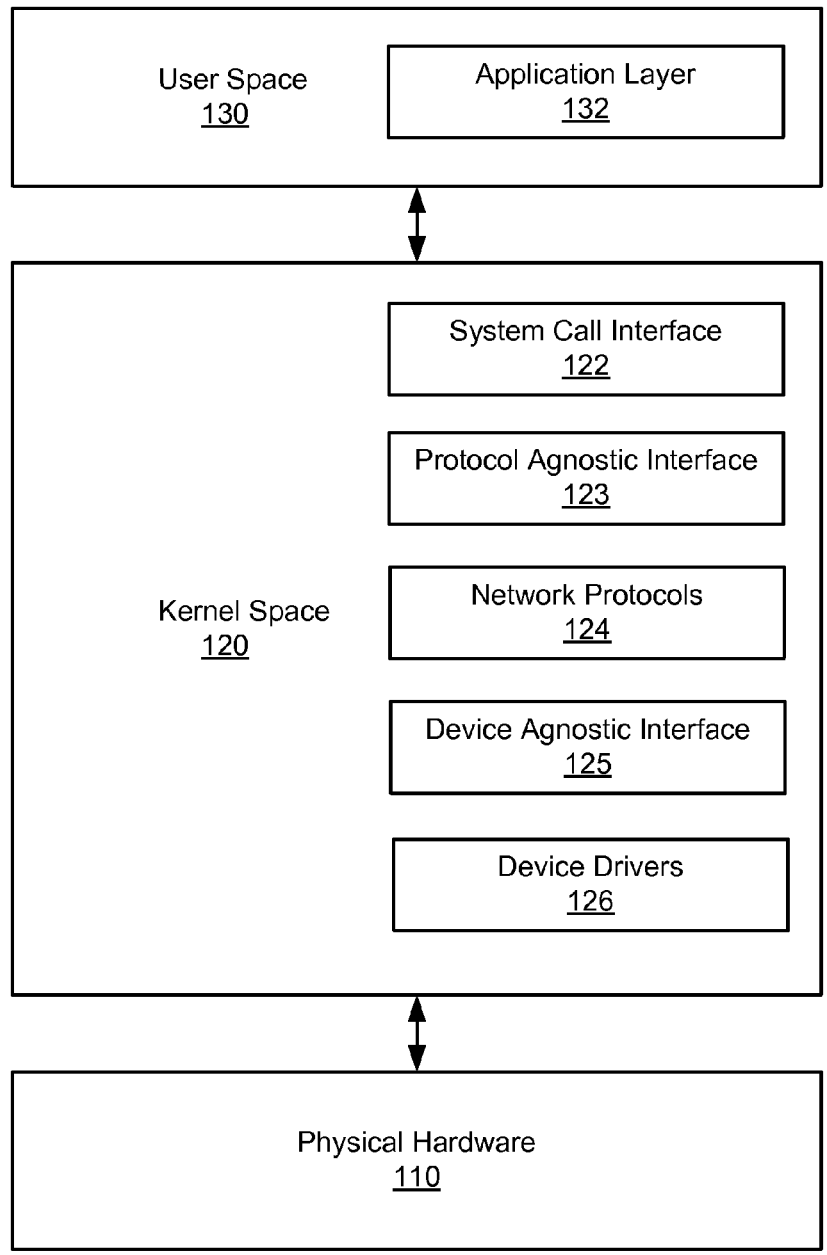
FIG. 1 illustrates block diagram of a software layer and hardware layer in a computing device.

FIG. 1 illustrates block diagram of a software layer and hardware layer in a computing device. The computing device of FIG. 1 includes a user space 130, kernel space 120 and physical device hardware 110. User space 130 includes an application layer 132. The kernel space 120 includes several software modules, including a system call interface module 122, a protocol agnostic interface module 123, a network protocols module 124, a device agnostic interface module 125, and a device driver module 126.

Application programs are typically restricted to running in user space and operate to send requests and receive responses from modules and other entities in kernel space 120. System call interface 122 receives and processes system calls from application layer 132. Protocol agnostic interface manages protocol operations. Network protocols 124 provides application layer access to networks. Device agnostic interface 125 provides the application layer with access to device functionality. Device drivers 126 provide an interface between the application layer and device hardware.

Physical Hardware 110 may include various forms of devices, including yet not limited to disk drives, solid state drives, keyboards, network interface cards, and other devices.

Figure 2:
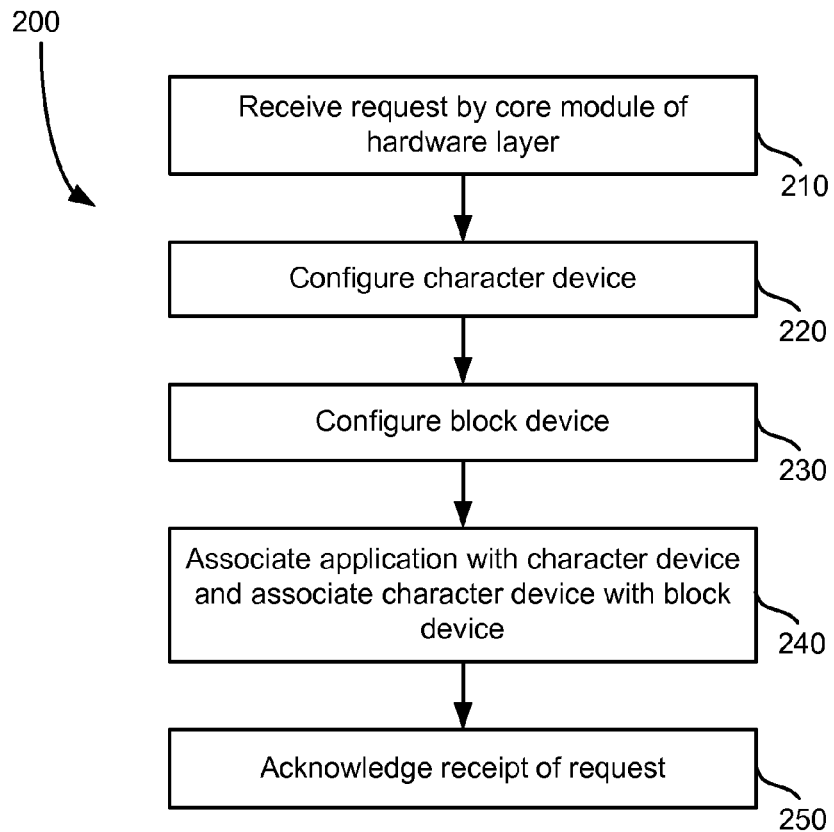
FIG. 2 illustrates a method for associating a charter device with a block device.

FIG. 2 illustrates a method for associating a charter device with a block device. The method of FIG. 2 may be implemented by a core module within an application layer of a computer device (see FIG. 3). First, a core module receives a request at step 210. After receiving a request, a character device may be configured at step 220. Configuring the character device may include setting up the device to communicate with the character device driver. A block device may then be configured at step 230. Configuring a block device may include setting up the block device to communicate with the block device driver.

An application may be associated with a character device and a character device may be associated with a block device at step 240. The result of step 240 is that the application is associated with a charblock, or character device and block device pair. The block request is intercepted by the core module. The request is acknowledged to the sending entity at step 250.

Figure 3:
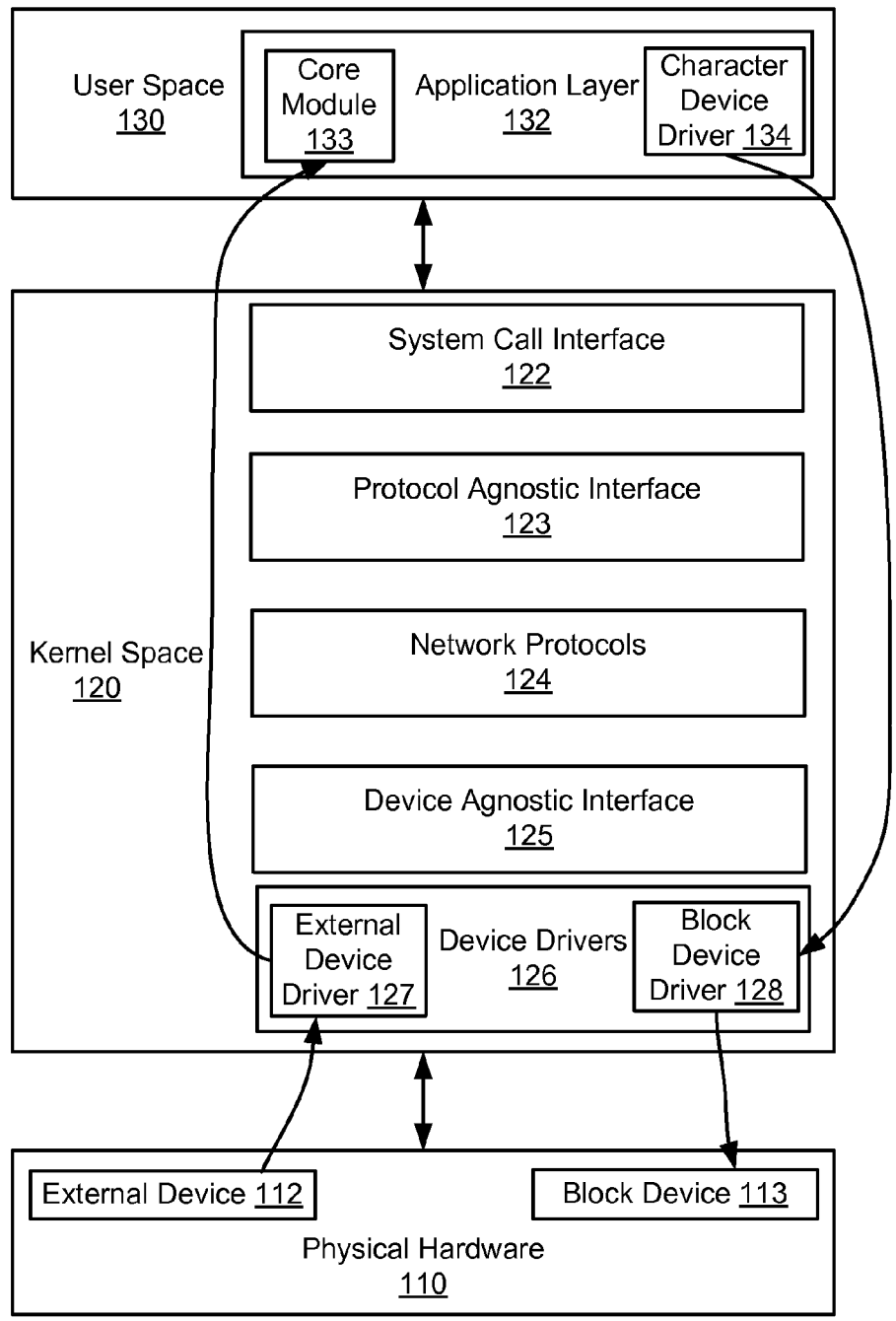
FIG. 3 illustrates block diagram of a software layer and hardware layer in a computing device wherein a block device intercepts a request.

FIG. 3 illustrates block diagram of a software layer and hardware layer in a computing device wherein a block device intercepts a request. FIG. 3 depicts the computing device software and hardware layers of FIG. 1 with additional discrete software and hardware elements, and how those elements interact in a manner consistent with an embodiment of the invention. User space 130 includes application layer 132 and kernel space 120 includes modules 122-126. The device of FIG. 3 further includes core module 133 and a character device driver 124 executing in the application layer 132. FIG. 3 also shows a device driver 127 for an external device and a block device 128 within device drivers layer 126 and kernel space 120. Hardware 110 includes an external device 112 and a block device 113. A block device may include, but is not limited to disk drives and solid state drives and by nature, store data in a series of blocks where each block contains a known number of bytes. Typically, block devices blocks contain 512 bytes, or 4000 bytes where each block is uniquely addressable.

Interactions between hardware and various software components in FIG. 3 are depicted with arrows. A request targeting a block device is received by the external device driver. This request is transferred from the external device driver to a core module. The core module then passes this request and associated information to a character device driver. The associated information may link a character device with a block device. The character device driver then passes the block device request to the block device which, in turn, passes the block device request to the block device 113.

In certain embodiments, character device driver functions and character device functions may be contained within a single software module.

Figure 4:
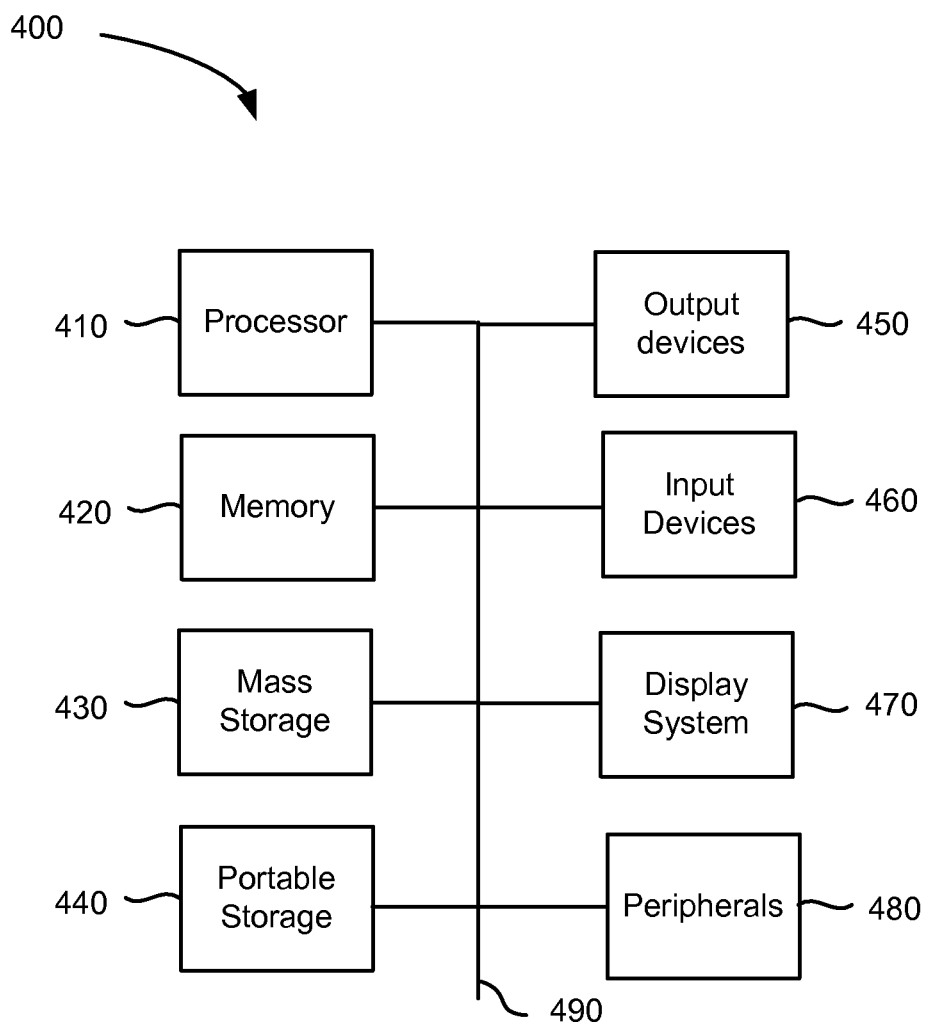
FIG. 4 is a block diagram of a device for implementing the present technology.

FIG. 4 is a block diagram of a device for implementing the present technology. FIG. 4 illustrates an exemplary computing system 400 that may be used to implement a computing device for use with the present technology. System 400 of FIG. 4 may be implemented in the contexts of the likes of the computing device of FIGS. 1 and 3. The computing system 400 of FIG. 4 includes one or more processors 410 and memory 420. Main memory 420 may store, in part, instructions and data for execution by processor 410. Main memory can store the executable code when in operation. The system 400 of FIG. 4 further includes a storage 420, which may include mass storage and portable storage, antenna 440, output devices 450, user input devices 460, a display system 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the storage 430, peripheral device(s) 480 and display system 470 may be connected via one or more input/output (I/O) buses.

Storage device 430, which may include mass storage implemented with a magnetic disk drive or an optical disk drive, may be a non-volatile storage device for storing data and instructions for use by processor unit 410. Storage device 430 can store the system software for implementing embodiments of the present invention for purposes of loading that software into main memory 410.

Portable storage device of storage 430 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device.

Antenna 440 may include one or more antennas for communicating wirelessly with another device. Antenna 416 may be used, for example, to communicate wirelessly via Wi-Fi, Bluetooth, with a cellular network, or with other wireless protocols and systems. The one or more antennas may be controlled by a processor 410, which may include a controller, to transmit and receive wireless signals. For example, processor 410 execute programs stored in memory 412 to control antenna 440 transmit a wireless signal to a cellular network and receive a wireless signal from a cellular network.

The system 400 as shown in FIG. 4 includes output devices 450 and input device 460. Examples of suitable output devices include speakers, printers, network interfaces, and monitors. Input devices 460 may include a touch screen, microphone, accelerometers, a camera, and other device. Input devices 460 may include an alpha-numeric keypad, such as a keyboard, for inputting alpha-numeric and other information, or a pointing device, such as a mouse, a trackball, stylus, or cursor direction keys.

Display system 470 may include a liquid crystal display (LCD), LED display, or other suitable display device. Display system 470 receives textual and graphical information, and processes the information for output to the display device.

Peripherals 480 may include any type of computer support device to add additional functionality to the computer system. For example, peripheral device(s) 480 may include a modem or a router.

The components contained in the computer system 400 of FIG. 4 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 400 of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Certain other embodiments of the invention enable an application in user space to perform direct memory accesses to or from a block device. Thus the application may direct the transfer of data to or from a range of memory addresses in the computer systems main memory. Thus a request for a block device may be initiated by an application interacting with a core module, and the methodology thus enables a new way for directing the flow of data to or from a computer systems main memory.

What is claimed is:
1. A non-transitory computer readable storage medium having embodied thereon a program executable by a proces- sor to perform a method for coupling applications running in user space with hardware block devices, the method comprising:

receiving an outside request by a core module;

configuring a character device by the core module to be in communication with a character device driver and a block device to be in communication with a block device driver in an operating system device tree;

associating an application with the character device; and associating the character device with the block device such that the application communicates with the block device through an association made by the core module.

2. The non-transitory computer readable storage medium of claim 1, the program further executable to configure the block device to power up.

3. The non-transitory computer readable storage medium of claim 1, the program further executable to acknowledge the completion of the outside request.

4. The non-transitory computer readable storage medium of claim 1, the program further executable to modify operational parameters on the block storage device by sending a configuration command or information through the association made by the core module, wherein the configuration commands or information is passed from the application through the character device driver, through the character device, through the block device driver, and to the block device.

5. The non-transitory computer readable storage medium of claim 1, the program further executable to:

read data from the block device by sending data request commands through the association made by the core module, wherein the data request commands are passed from the application through the character device driver, through the character device, through the block device driver, and to the block device; and send requested data from the block device through the block device driver, through the character device, and through the character device to the application.

6. The non-transitory computer readable storage medium of claim 5, the program further executable to send data through the association made by the core module, wherein the data are passed from the application through the character device driver, through the character device, through the block device driver, and to the block device.

7. The non-transitory computer readable storage medium of claim 1, the program further executable to:

command the reading of data from the block device by sending data request commands and information through the association made by the core module, wherein the data request commands and information are passed from the application through the character device driver, through the character device, through the block device driver, and to the block device; and send requested data from the block device directly to system memory addresses specified by the application data request commands and information.

8. The non-transitory computer readable storage medium of claim 1, the program further executable to:

command the writing of data to the block device by sending data write commands and information through the association made by the core module, wherein the data write commands and information are passed from the application through the character device driver, through the character device, through the block device driver and to the block device; and receive requested data directly from system memory addresses specified by the application data request commands and information.

9. The non-transitory computer readable storage medium of claim 1, the program further executable to acknowledge the request.

10. The non-transitory computer readable storage medium of claim 8, wherein the write commands bypass a kernel element.

11. The non-transitory computer readable storage medium of claim 6, wherein the data request commands bypass a kernel element.

12. The non-transitory computer readable storage medium of claim 1, wherein at least one of a write command, a read command, and a configuration command bypasses at least a system call interface in a kernel of an operating system software running on a computing device.

\* \* \* \* \*